Aug. 6, 1963  C. H. TIDMAN  3,099,951
COOKING GRILL
Filed June 21, 1961

INVENTOR.
CHARLES H. TIDMAN
BY
Patrick J. Henry
ATTORNEY

United States Patent Office 3,099,951
Patented Aug. 6, 1963

3,099,951
COOKING GRILL
Charles H. Tidman, Columbus, Ga., assignor to Columbus Iron Works Company, Columbus, Ga., a corporation of Georgia
Filed June 21, 1961, Ser. No. 118,584
4 Claims. (Cl. 99—446)

This invention relates to a cooking grill and especially to a grill or grid or framework support for supporting food while being cooked and to an arrangement therein for directing the greases and juices away from the fire.

In cooking meats and other foods on a grill above a charcoal or other type of fire, the food in being heated release fats, oils, greases and other juices which ordinarily drop onto the fire or onto the heating elements. This causes considerable difficulty from the standpoint of cleanliness, and especially from the standpoint of flames and fires which flare-up when the fats and oils strike heated surfaces or charcoal. The present invention pertains to the grill upon which the meat or other food is supported during cooking and to a particular arrangement in the grill for directing the greases, oils and juices away from the grill to the outer portions thereof and to drip these materials away from the fire or heated surfaces.

Generally described, without restriction on the scope of this invention as contained in the appended claims, the particular embodiment in the present application is adapted for use in an outdoor cooking apparatus of the sort used in the present time for either open or closed cooking, smoke cooking or other types of outdoor cooking on the patio and the like. The grill is a single, integral and unitary structure adapted to be cast from cast iron, aluminum or other material and may be made in sections or units to be fitted together across the space of a cooker. The grill is generally rectangular or square in formation with an outer border of elongated bars rigidly attached together and extending longitudinally thereacross a plurality of ribs each having a flat upper surface and together forming a flat surface upon which the food may be placed. A plurality of shorter ribs or struts are placed at strategic locations transversely of the longitudinal ribs and are rigidly attached as by molding integrally in place or by welding or otherwise forming a rigid unit with the longitudinal ribs. Each of the undersides of the ribs is tapered on the edge from substantially in the center thereof outwardly to a lower point at the outer periphery where the ribs join to the outer edge forming a slope or tapered under surface on the grill across which juices, greases and oils will travel respectively by gravity to the lower outer edge at which point there is attached as by molding or otherwise a plurality of grease drip-tips or protrusions arranged across transversely of the grill adjacent the outer edge thereof. If desired, semi-circular gutters may be provided to direct the grease to a particular place after dripping from the drip-tips.

A primary object of this invention is to provide a grid or grill having a means thereon for directing greases, fats and oils from the top surface across the grill and away from the heat or fire therebelow.

Still another object of this invention resides in the particular construction of the grill or grid wherein the underside is sloped downwardly and outwardly from the approximate center thereof thereby to direct the fats, oils and greases away from the interior of the grids to an outer edge thereof.

An additional object of this invention resides in the arrangement recited in the preceding paragraph together with a plurality of grease tips provided at a strategic outward location to receive the fats, oils and greases running by gravity from the sloped bottom and dripping same away from the grill.

A further object of the present invention resides in the construction of the device whereby it may be molded or cast as a unitary arrangement having all of the foregoing attributes.

Other and further objects and advantages of my invention will become apparent upon reading the following specification taken in conjunction with the accompanying drawings, in which.

Figure 1:
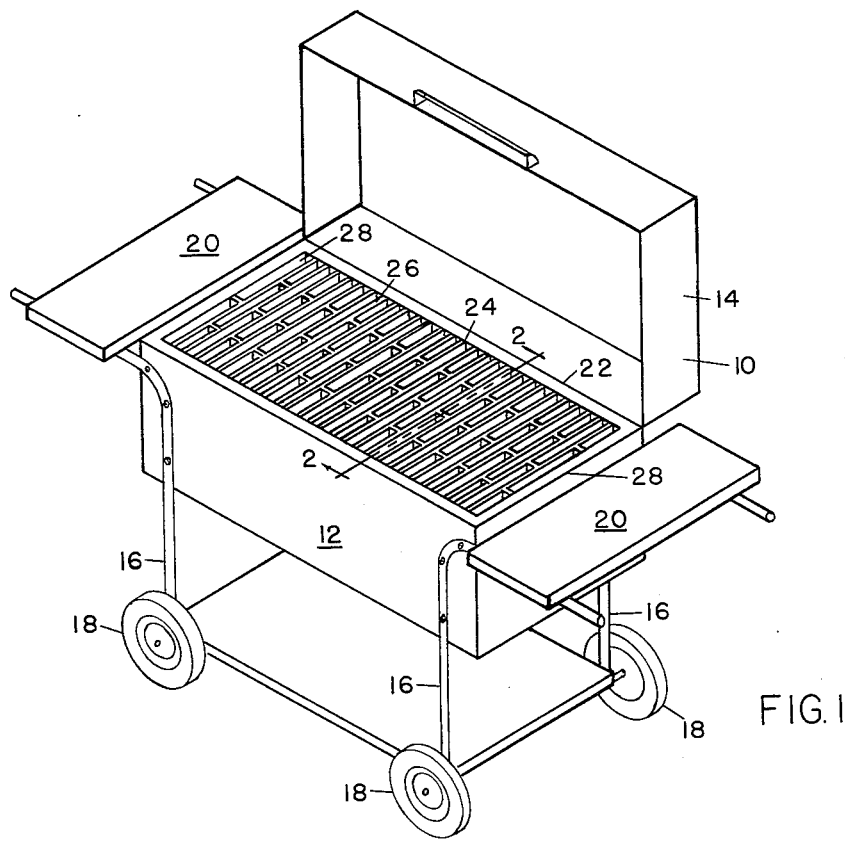
FIG. 1 is a perspective view of a typical outdoor cooking device having the present grill positioned for use therein.
Figure 2:
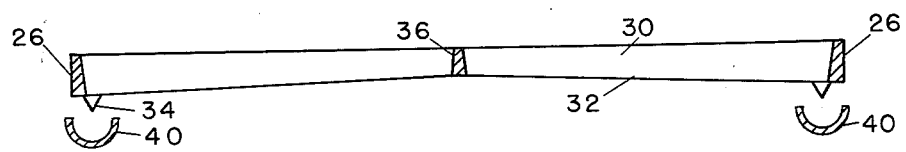
FIG. 2 is a cross-sectional view of the present invention taken substantially along lines 2—2 in FIG. 1.
Figure 3:
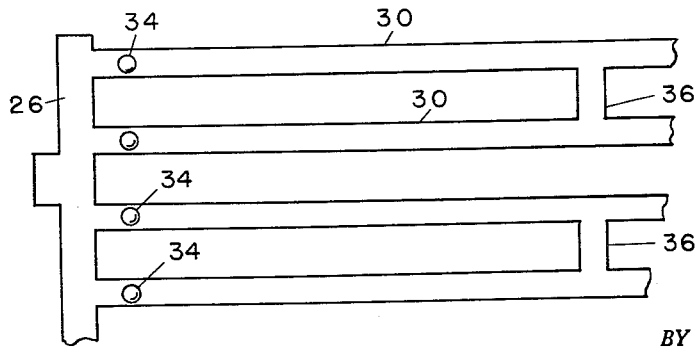
FIG. 3 is a top plan view of the grill shown in FIG. 1 with a portion thereof broken away.

Referring initially to the arrangement shown in FIG. 1, it is worthwhile to note that one particular use of the present invention is in the so-called outdoor cooking or patio cooking involving the use of typical closed cooker 10 with a cooker body 12 having a hinged cover 14 thereon. The cooker 10 is supported on a tubular framework 16 having wheels 18 thereon whereby the cooking device is made portable. Trays 20 are supported on each end of the cooker 19 on the framework 16, providing cutting surfaces and other work surfaces incident to the preparation of food. The container body 12 is adapted to hold a supply of fuel, such as charcoal or charcoal bricketts (not shown), which are ignited by any suitable means to provide quite an intense heat within the body 12 which functions as a firebox.

Removably positioned above the firebox or body 12 on a suitable peripheral edge 22 of the upper portion of body 12 is the grid or grill or framework 24 of the present invention, which may be any size and dimension desired. In the present embodiment, firebox or body 12 is rectangular and the longer side and elements in that direction are considered as longitudinal and the shorter side and elements in that direction as transverse which also happens to be the shortest direction for grease, drippings, etc. to travel from the meat above the firebox or body 12 to one side or the other.

The grill or grid 24 is adapted, in the particular embodiment shown herein, to be constructed by casting same from cast iron or aluminum or the like in a mold in a unitary formation without any necessity for additional assembly or construction. All of the attributes and functions of the present invention, therefore, are obtainable in one unique integral formation which may be constructed by molding in one operation.

Grid or grill 24 comprises a rectangular outer peripheral framework comprising side members 26 and end members 28 rigidly cast or otherwise attached together to form a rigid framework. Transverse ribs 30 of bar-like construction extend transversely across between the longitudinals 26 and each one thereof has the upper surface thereof of flat construction so that together they form a substantially flat upper cooking surface on which meat or other food may be placed. The underside or under portion of each of the bar members 30 is formed in a sloped or tapered construction from the center approximately to the outer longitudinals 26 in an outwardly and downwardly direction along the bottom surfaces or under surfaces 32. Integrally formed at the outer terminal end of one or more of the transverse members 30 are a plurality of conical grease drip-tips or protrusions 34 which, like all of the other parts of the present device, may be formed in the cast construction. Between the transverse bars 30 at strategic locations and preferably in a symmetrical structural pattern are a plurality of longitudinal short structural connector members 36 completing the rigidity of the overall frame which makes up the grill 24 and providing a complete open grid or network on which food may be placed.

In the operation of the present device, the grid is normally located in the cooker in the manner shown in FIG. 1 and food is placed thereon. Typically, a large steak or several pieces of meat would be placed on top of the grid or grill 24 for cooking. As mentioned previously, in the fire box or body 12 a charcoal or other type fire would be built providing quite an intense heat from the bottom of the box onto the grid or grill 24.

As the meat or food on the grill 24 becomes heated, the fat, oils, greases and other juices therein collect on the top of bar members 30 and by gravity run along the members 30 to the undersurface 32 thereof. At this point, according to the present construction, these oils, fats and greases are by gravity led along the tapered undersurface 32 of the grid 24 outwardly to the area adjacent the outer longitudinals 26 at which position the juices, oils and greases reach the drip-tips 34 and are released by gravity therefrom. If desired, semi-circular channels 40 or other suitable members may be provided at this point to receive and collect the material dripped from the drip-tips 34 and to direct same to any suitable collection area, as for example one side or corner area of the firebox 12 away from the main heat of the fire.

While I have shown and described a particular embodiment of my invention together with suggested uses and a particular environment therewith, this is by way of illustration only and is not to be construed as any sort of limitation on the scope of my invention since various alterations, substitutions, arrangements, eliminations, deviations and changes may be made in the embodiment shown without departing from the scope of my invention as defined in the appended claims.

I claim:

1. In a cooking grill on which food is normally placed on the top thereof to be cooked from a fire or heat located therebelow, an integrally cast frame comprising spaced, longitudinal members connected together by transverse bar members rigidly affixed thereto and integrally formed therewith providing a rigid peripheral framework, there being a plurality of said elongated, transverse bar members extending in spaced relationship transversely across said framework and spaced from one another, all of said longitudinal members and said transverse bar members having the upper surface thereof substantially in alignment with each other and each being of substantially flat formation together forming a substantially even upper surface on which food may be placed, each of the undersides of each of said respective transverse bar members being formed in a tapered relation from the approximate center portion thereof downwardly and outwardly to the outer periphery of said longitudinal framework, whereby the juices, fats, oils, greases and the like produced by cooking food on said grill will be directed to the underside thereof and thence downwardly and outwardly along said sloped bottom by gravity to the outer edge at which point they drip from said grill away from the fire.

2. The device claimed in claim 1 wherein there are grease collection tips formed at the approximate ends of each of said bar members to collect the grease delivered thereto and to drip same in approximate alignment from said grill.

3. In a cooking grill on which food is normally placed to be cooked from a fire or heat located there below, an integrally cast substantially rectangular frame comprising spaced longitudinal members connected together by transverse bar members rigidly affixed thereto providing a rigid peripheral framework, there being a plurality of said elongated transverse bar members extending in spaced relationship transversely across said framework and spaced from one another, all of said transverse members and said longitudinal members having the upper surface thereof substantially in alignment with each other and each being of substantially flat formation together forming a substantially even upper surface on which food may be placed, each of the undersides of each of said respective transverse bar members being formed in a tapered straight-line relation with a flat surface from the approximate center portion thereof downwardly and outwardly to the outer periphery of said longitudinal framework, and some of said longitudinal members being a plurality of short structural members interposed rigidly between successive pairs said transverse bar members to complete a rigid structural relationship, whereby the juices, fats, oils, greases and the like produced by cooking food on said grill will be directed to the underside thereof and thence downwardly and outwardly along said sloped bottom by gravity to the outer edge at which point they drip from said grill away from the fire.

4. The device claimed in claim 3 wherein there are grease collection tips formed at the approximate ends of each of said bar members to collect the grease delivered thereto and to drip same in approximate alignment from said grill.

References Cited in the file of this patent

UNITED STATES PATENTS

| | | |
|---|---|---|
| 1,422,835 | Condy | July 18, 1922 |
| 2,720,827 | Del Francia | Oct. 18, 1955 |
| 2,898,846 | Del Francia | Aug. 11, 1959 |
| 2,985,097 | Nevin | May 23, 1961 |
| 3,040,637 | Bremsey | June 26, 1962 |